(12) United States Patent
Stahl et al.

(10) Patent No.: US 10,678,187 B2
(45) Date of Patent: Jun. 9, 2020

(54) LARGE AREA LENS-FREE IMAGING DEVICE

(71) Applicant: IMEC VZW, Leuven (BE)

(72) Inventors: Richard Stahl, Rotselaar (BE); Tom Claes, Merelbeke (BE); Xavier Rottenberg, Kessel-Lo (BE); Geert Vanmeerbeeck, Keerbergen (BE); Andy Lambrechts, Herent (BE)

(73) Assignee: IMEC VZW, Leuven (BE)

( * ) Notice: Subject to any disclaimer, the term of this patent is extended or adjusted under 35 U.S.C. 154(b) by 33 days.

(21) Appl. No.: 15/545,611

(22) PCT Filed: Feb. 4, 2016

(86) PCT No.: PCT/EP2016/052355
§ 371 (c)(1),
(2) Date: Jul. 21, 2017

(87) PCT Pub. No.: WO2016/124677
PCT Pub. Date: Aug. 11, 2016

(65) Prior Publication Data
US 2018/0011443 A1 Jan. 11, 2018

(30) Foreign Application Priority Data

Feb. 6, 2015 (EP) ..................................... 15154087

(51) Int. Cl.
*H04N 5/89* (2006.01)
*H04N 9/47* (2006.01)
(Continued)

(52) U.S. Cl.
CPC ......... *G03H 1/0465* (2013.01); *G01N 15/147* (2013.01); *G01N 15/1434* (2013.01);
(Continued)

(58) Field of Classification Search
USPC ............................ 348/40, 61, 79, 77, 72, 65
See application file for complete search history.

(56) References Cited

U.S. PATENT DOCUMENTS

| 5,835,472 | A | * | 11/1998 | Horie | G11B 7/1353 |
| | | | | | 369/110.02 |
| 6,124,827 | A | * | 9/2000 | Green | H01Q 3/22 |
| | | | | | 342/157 |
| 7,745,832 | B2 | * | 6/2010 | Hsieh | H01L 33/641 |
| | | | | | 257/706 |
| 2014/0333778 | A1 | * | 11/2014 | Bendall | G01B 11/002 |
| | | | | | 348/187 |

OTHER PUBLICATIONS

Alexander Mukasyan, Interference of Light Waves, University of Notre Dame (Year: 2014).*

(Continued)

*Primary Examiner* — Daquan Zhao
(74) *Attorney, Agent, or Firm* — McDonnell Boehnen Hulbert & Berghoff LLP

(57) ABSTRACT

Embodiments described herein relate to a large area lens-free imaging device. One example is a lens-free device for imaging one or more objects. The lens-free device includes a light source positioned for illuminating at least one object. The lens-free device also includes a detector positioned for recording interference patterns of the illuminated at least one object. The light source includes a plurality of light emitters that are positioned and configured to create a controlled light wavefront for performing lens-free imaging.

19 Claims, 6 Drawing Sheets

(51) Int. Cl.
*A62B 1/04* (2006.01)
*G03H 1/04* (2006.01)
*G02B 27/00* (2006.01)
*G02B 21/00* (2006.01)
*G01N 15/14* (2006.01)
*G02B 6/122* (2006.01)
*H04N 5/225* (2006.01)
*H04N 13/00* (2018.01)
*G02B 6/12* (2006.01)
*H04N 5/374* (2011.01)

(52) U.S. Cl.
CPC ......... *G01N 15/1484* (2013.01); *G02B 6/122* (2013.01); *G02B 21/0008* (2013.01); *G02B 27/0087* (2013.01); *G03H 1/0443* (2013.01); *H04N 5/2256* (2013.01); *G01N 2015/1454* (2013.01); *G02B 2006/12061* (2013.01); *G03H 2001/0447* (2013.01); *G03H 2222/34* (2013.01); *G03H 2222/35* (2013.01); *G03H 2222/53* (2013.01); *H04N 5/374* (2013.01)

(56) References Cited

OTHER PUBLICATIONS

PCT Search Report and Written Opinion, PCT International Application No. PCT/EP2016/052355, dated Apr. 7, 2016, 12 pages.
Riesenbeg, R. et al., "Coherent Light Microscopy with a Multi-Spot Source", Confocal, Multiphoton, and Nonlinear Microscopic Imaging III, Jan. 1, 2007, pp. 663001-1-663001-7.
Bishara, Waheb et al., "Holographic Pixel Super-Resolution in Portable Lensless On-Chip Microscopy Using a Fiber-Optic Array", Lab on a Chip, vol. 11, 2011, 1276-1279.
Sun Jie et al., "Large-Scale Nanophotonic Phased Array", Nature, vol. 493, Jan. 10, 2013, pp. 195-199.
Riesenberg, Rainer, "Pinhole-Array and Lensless Micro-Imaging With Interferograms", DGAO Proceedings, May 19, 2005, 2 pages.
Van Laere, Frederik et al., "Compact Focusing Grating Couplers for Silicon-on-Insulator Integrated Circuits", IEEE Photonics Technology Letters, vol. 19, No. 23, Dec. 1, 2007, pp. 1919-1921.

* cited by examiner

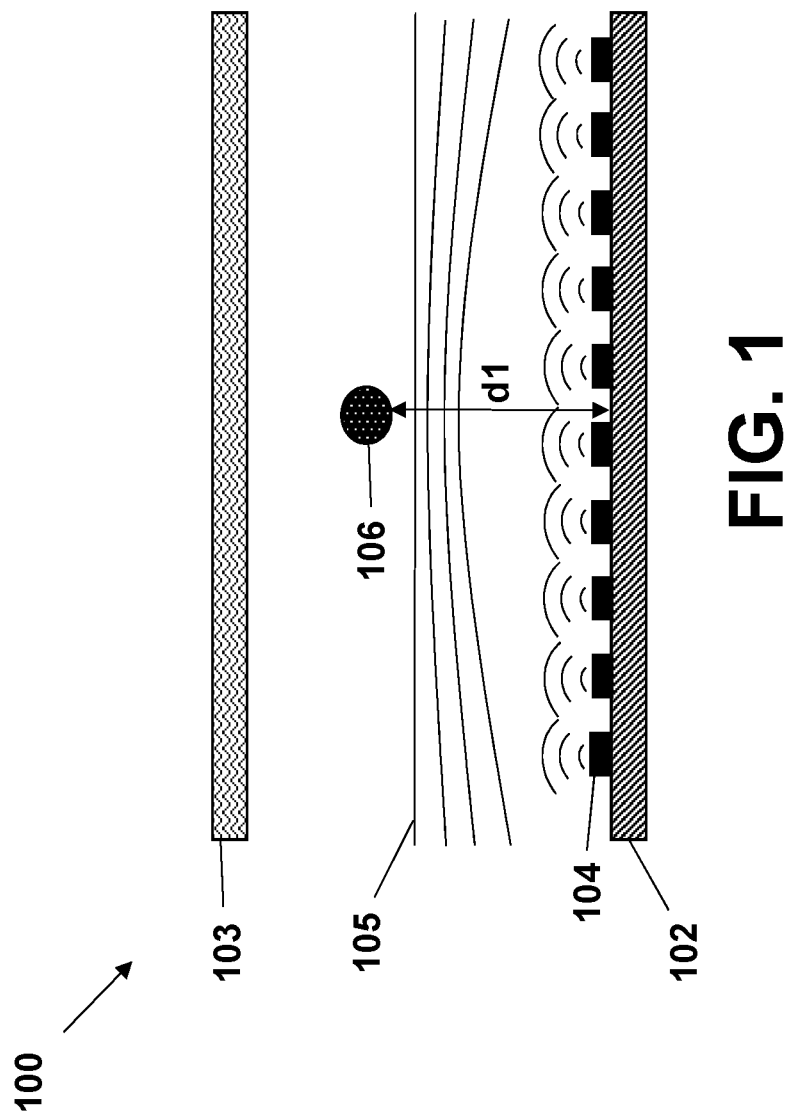

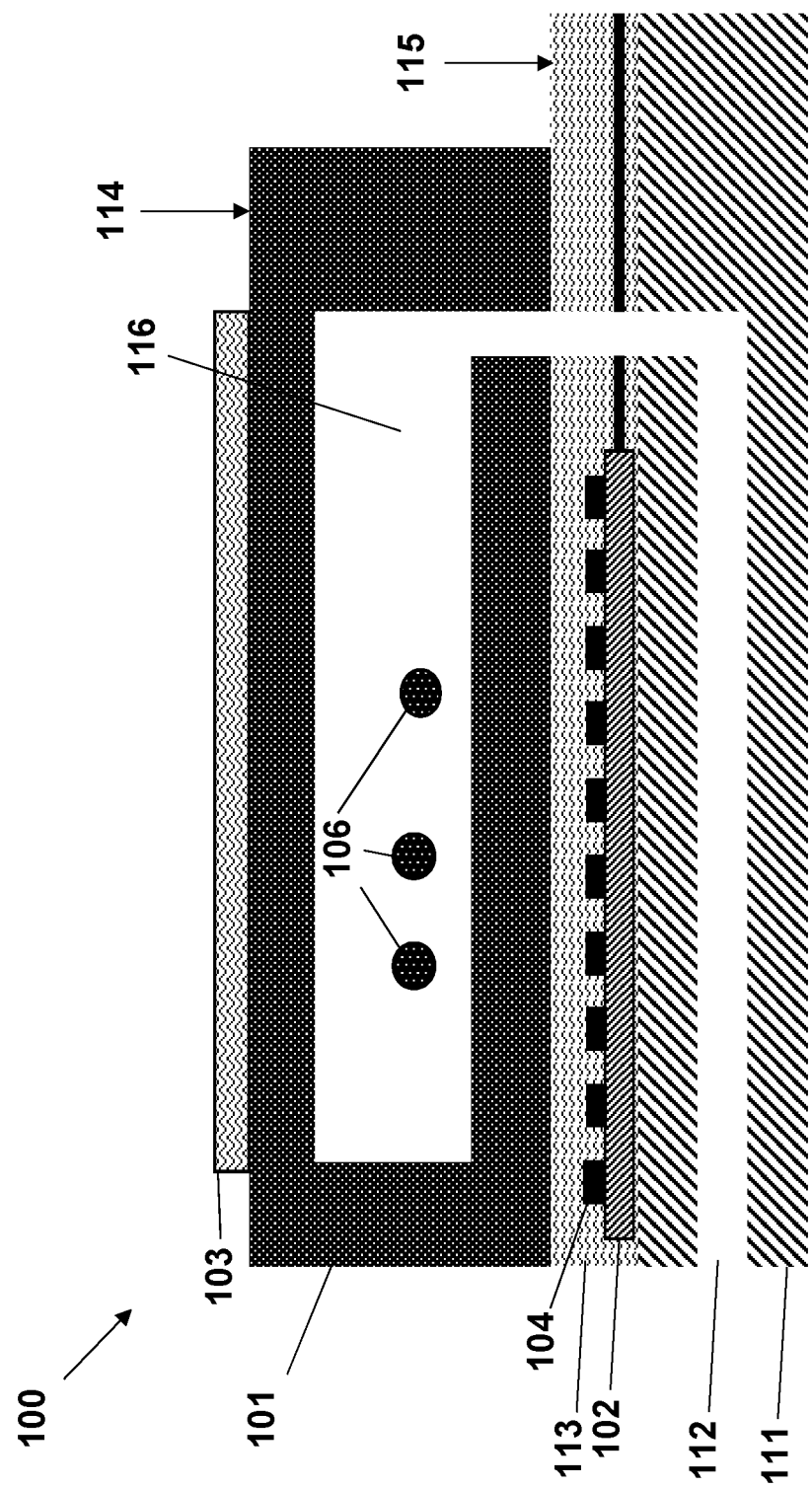

LARGE AREA LENS-FREE IMAGING DEVICE

CROSS-REFERENCE TO RELATED APPLICATION

The present application is a national stage entry of PCT/EP2016/052355 filed Feb. 4, 2016, which claims priority to EP 15154087.9 filed on Feb. 6, 2015, the contents of each of which are hereby incorporated by reference.

FIELD OF THE DISCLOSURE

The disclosure relates generally to the field of lens-free imaging and in particular to the field of large area lens-free imaging devices.

BACKGROUND TO THE DISCLOSURE

Lens-free imaging is an imaging technique based on holographic imaging. Interference patterns of objects are recorded and used to image cells. In large area lens-free imaging devices, a light source simultaneously illuminates multiple objects on a surface. Ideally, such a light source generates a planar light wavefront able to illuminate all objects simultaneously. To create such a planar wavefront, some devices use a light source that is positioned at a certain distance from the objects. Typically such a distance is in the order of 100 mm or more. This distance requirement prevents the lens-free device to be miniaturized and limits integration.

SUMMARY OF THE DISCLOSURE

Presented is a lens-free device for imaging one or more objects, the device comprising: a light source positioned for illuminating at least one object; a detector positioned for recording interference patterns of the illuminated at least one object; and wherein the light source comprises a plurality of light emitters, which are positioned and configured to create a controlled light wavefront for performing lens-free imaging when emitting light.

In some embodiments, by using a plurality of light emitters to create the controlled wavefront (e.g. controlled intensity and phase), the distance between the light source and the imaged object or objects can be reduced. This therefore allows for the creation of a very compact lens-free imaging device.

According to example embodiments, an object may be, for example, but is not limited to, a single cell, a colony of cells, tissue, microorganisms, microscopic particles in fluid or gasses, microscopic defects in transparent materials or microscopic bubbles.

According to an example embodiment, the plurality of light emitters are photonic light emitters. According to an example embodiment, the plurality of light emitters is a photonic phased array. According to an example embodiment, the light source is a photonic phased array. According to an example embodiment, the plurality of light emitters are positioned in a fractal configuration.

According to example embodiments, a controlled light wavefront may be, for example, a planar, spherical or cylindrical wavefront or a plurality of spherical wavefronts. According to an example embodiment, the controlled light wavefront is a quasi-planar wavefront for performing large-area lens-free imaging.

According to an example embodiment, the light emitters are grating couplers. According to another example embodiment, the light emitters are micro-structures fabricated in a slab of material suitable for propagating light.

According to an example embodiment, the light source further comprises an optical distribution network configured for distributing a light signal to the light emitters. According to an example embodiment, the optical distribution network is designed such that the phase difference between adjacent light emitters is an integer multiple of $2\pi$.

According to an example embodiment, the lens-free device is a silicon integrated device.

According to an example embodiment, the distance between the light source and the provided objects or a sample containing one or more objects is 5 mm or less, for example 1 mm.

According to an example embodiment, the lens-free device further comprises a component for providing the one or more objects. According to an example embodiment, the component may comprise a sample holder. According to an example embodiment, the component may comprise a fluidic channel. According to an example embodiment, the component may comprise a plurality of micro-fluidic channels located in a layer on top of the light source and the plurality of light emitters are positioned such that each microfluidic channel is illuminated by at least two different light emitters. According to another embodiment the component may comprise a transparent sample holder having a fluidic compartment for providing objects in. According to an example embodiment, the detector is coupled to a surface of the sample holder and the light source is coupled to another surface of the sample holder.

According to an example embodiment, the lens-free device for imaging objects comprises: a component for providing one or more objects (in or on); a light source positioned for illuminating provided objects; a detector positioned for recording interference patterns of illuminated objects; wherein the light source comprises a plurality of light emitters. According to an embodiment, the plurality of light-emitters are positioned and configured to create a controlled light wavefront for performing lens-free imaging when emitting light.

A lens-free device according to example embodiments herein described is especially suitable for imaging a large surface or area.

A lens-free device according to example embodiments herein described can be easily scaled up to the requirements of the application, e.g. the size of the image sensor and the corresponding light-source in order to meet the accuracy and the throughput required by the application. By having embodiments that can be completely manufactured and integrated in semiconductor technology, a single-chip and/or compact/portable system can be designed at low cost.

A lens-free device according to example embodiments herein described can be used, for example, in cell culture and tissue monitoring systems and related applications, for example, wound healing assays, stem cell monitoring, cardiac cell monitoring and drug toxicity analysis.

A lens-free device according to example embodiments herein described can also be used, for example, in in-flow cell imaging systems and related applications for example, in-flow blood cell analysis, cancer cell detection and/or cell sorting.

A lens-free device according to example embodiments herein described can be easily scaled up to the requirements of industrial applications and industrial grade throughputs. It can also be used, for example, in industrial (microscopic)

inspection systems and related applications, for example, quality inspection applications of thin and/or transparent materials ranging from centimeters up to (but not limited to) a meter wide inspection area; contamination detection applications of material surfaces or in fluid contamination; and multi-view imaging devices. In this context a plurality of lens-free devices can cover a large total inspected surface or volume.

BRIEF DESCRIPTION OF THE DRAWINGS

FIG. 1 illustrates a lens-free device, according to example embodiments.

FIG. 5 illustrates a lens-free device, according to example embodiments.

DESCRIPTION OF THE DISCLOSURE

Figure 3:
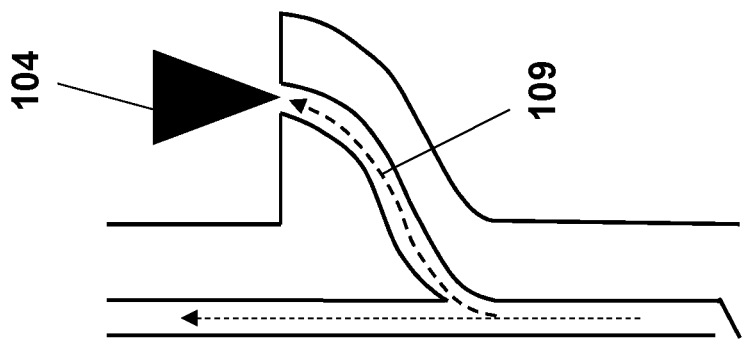
FIG. 3 illustrates a structure for emitting light, according to example embodiments.

The lens-free device for imaging one or more objects is described in more detail in the paragraphs below.

Throughout this disclosure reference is made to a "lens-free imaging device". This relates to a device in which no lenses are required to perform the imaging of a sample containing one or more objects. Thus, no lenses are required in between the light source, the sample/object and the detector. The lens-free device described in this disclosure does not require lenses to perform the imaging of objects.

According to an example embodiment, the lens-free device uses a light source that comprises a plurality of light emitters to illuminate objects, for example in a fluid sample. By constructive/destructive inference of light emitted by different light emitters, a controlled light wavefront is formed that is suitable for performing large area lens-free imaging. Using such a controlled light wavefront may allow objects to is that object to be positioned close to the light source. This contributes to the compactness of the device and allows complete semiconductor integration.

According to example embodiments, the lens-free device may be a semiconductor integrated device, e.g. a silicon integrated device. For example, the lens-free device may be fabricated completely using CMOS compatible process steps. According to an example embodiment, the lens-free imaging device may comprise a component, e.g. a fluidic component or a substrate, for providing objects located in or on the component or substrate. According to an example embodiment, the objects can be provided in a fluidic component. Alternatively, the objects can be provided or located on a surface of the substrate, e.g. a tissue sample that is provided on the substrate surface. The objects may be provided to the component in a fluid sample. The component may comprise an imaging area where the objects are imaged. A lens-free imaging device according to an example embodiment may comprise an inlet for providing a fluid sample to the component. The fluid sample may be a biological fluid including, but not limited to, blood, serum, urine, gastric and digestive juices, tears, saliva, stool, semen, and interstitial fluids derived from tumorous tissues. According to some embodiments, the objects may be objects of a biological nature including, but not limited to cells, blood cells, tumor cells, or objects of a non-biological nature including, but not limited to, beads or metal beads. A lens-free imaging device according to example embodiments comprises a light source that is positioned to illuminate the objects when in the imaging area. Thus, the light source is positioned such that at least the part of the component where objects are provided and/or located is illuminated. For example, when objects are provided or located on a surface of the component, that surface is illuminated by the light source. According to an example embodiment, the light source comprises a plurality of light emitters. The light source may be fabricated completely using semiconductor process technology, e.g. CMOS compatible processing steps, which contributes to the monolithic integration of the lens-free device. A detector is positioned to detect interference patterns of objects illuminated by the light source. The detector may be an image sensor, e.g. a CMOS image sensor, capable of recording interference patterns of illuminated objects. The lens-free imaging device may further comprise an optical fiber for providing a light signal to the lens-free imaging device.

According to an embodiment of the disclosure, the plurality of light emitters are designed and positioned such that through constructive/destructive interference of light signals emitted by the different light emitters a controlled wavefront is created. According to embodiments of the disclosure, the controlled wavefront may be quasi-planar or substantially planar.

According to an embodiment, the light source is a photonic phased array comprising N small optical antennas that function as light emitters, wherein N is an integer. For example, each optical antenna may have a diameter in the range of 1 μm to 50 μm. The optical antennas may be positioned in a matrix configuration with period P (in x and y-direction). Alternatively, a fractal configuration may be used which reduces the optical path length and reduces losses of an optical signal when propagating through the photonic phased array. Generally, it is beneficial to choose the period P as small as possible, and hence it is beneficial to have small optical antennas. These optical antennas can be dielectric grating antennas, plasmonic antennas or point scatters. The antennas may not be directive (e.g. collimated). If they are directive, it is beneficial to direct them in the same direction as the (passive) phased array, e.g. substantially parallel to the planar wavefront generated by the phased array. A possible implementation of a collimating grating antenna (also known as grating coupler) is described in reference "Compact Focusing Grating Couplers for Silicon-on-Insulator Integrated Circuits", IEEE Photonics Technology Letters, 19(23), p. 1919-1921 (2007). According to an example embodiment, the antennas in the phased array are fed by one common illumination source that is sufficiently temporally coherent, with a coherence length that is much larger than the largest optical path length in the phased array. According to an example embodiment, the coherence length is 10 times larger than the diagonal dimension of the phased array. For example, for a phased array with a diagonal dimension of 10 mm, a coherence length of 100 mm is used. According to an example embodiment, light from the illumination source is coupled to an optical semiconductor waveguide. Waveguide power splitters may further distribute the light in this single waveguide over a plurality of waveguides. According to an example embodiment, the optical antennas are optically coupled to the waveguides in the array (N) such that for example a matrix configuration is created by the position of the optical antennas. Optical waveguide power splitters, for example directional couplers, multimode interference couplers and Y-splitters, may be used.

The phase front of light wave created by the phased array depends on the phase difference between the excitations of the antennas in the array. According to an example embodiment, in order to obtain a controlled phase front such as a quasi-planar phase front directed vertically away from and substantially parallel to the phased array, the waveguide and power splitters connecting the source to each antenna may be designed such that the phase difference between adjacent antennas is an integer multiple of $2\pi$.

When the object to be imaged is located in the near field of the phased array, which occurs when the object is closer than $$d = \frac{2D^2}{\lambda}$$

with D the diameter of the phased array and $\lambda$ the free-space wavelength of the source light, care can be taken for the Talbot effect. In this near-field region, self-imaging of the field profile of the phased array takes place at distances that are an integer multiple of half the Talbot distance. For a uniform illumination of the object, the device should be designed such that the object is not located in such a self-imaging plane. According to an embodiment of the disclosure, the objects to be imaged are located in between the plane of the phased array and a self-imaging plane or in between self-imaging planes.

In some embodiments of the disclosure, by using a plurality of light emitters (e.g. optical antennas) to create the controlled wavefront (controlled intensity and controlled phase), the distance between the light source and the objects can be reduced drastically compared to using a single light emitter as in some lens-free imaging devices. In order to provide just an example, the distance between the object and the light source according to example embodiments of the present disclosure may be as short as 5 mm or less, in contrast to a distance of 100 mm used in some lens-free devices. As another example, the distance between the object and the light source according to example embodiments of the present disclosure may be 1 mm. The reduction of this distance contributes to the compactness of the lens-free imaging device. According to another example embodiment of the present disclosure, the distance between the light source and the object and the distance between the object and the detector may be equal.

FIG. 1 illustrates an example embodiment of the disclosure. A light source 102 is positioned at a distance d1 from the detector 103. This distance d1 may be between 500 μm and 5 mm. Depending on the application, this distance d1 may range also between 500 μm and 1 mm. Depending on the thickness of the objects or sample to be imaged, the distance d1 is adapted such that appropriate illumination is attained. The light source 102 is positioned substantially parallel to the detector 103. Objects 106 to be illuminated are positioned in the imaging area in between the light source 102 and the detector 103. The light source comprises a plurality of light emitters 104. These light emitters 104 are positioned and configured thereby creating from all emitted light signals a controlled wavefront 105 suitable for performing large area lens-free imaging. The wavefront 105 is used to illuminate the objects 106. The detector 103 is further positioned to record interference patterns of illuminated objects 106. The distance from the detector source to the objects may be between 500 μm and 5 mm. Depending on the application, this distance may be between 500 μm and 1 mm.

According to an example embodiment, the light source comprises an optical distribution network configured for distributing a light signal to the light emitters. For example, the optical distribution network is a plurality of optically connected optical waveguides, e.g. Silicon or Si Nitride waveguides, which are configured to distribute a light signal. The optical distribution network may be a single mode photonic waveguide distribution network. Along each optical waveguide of the network, light emitters are optically coupled to the optical waveguide such that a light signal distributed by that optical waveguide to the light emitters is coupled out of the waveguide by the light emitters. The layout of the optical distribution may be a matrix layout or a fractal layout. The fractal layout reduces the length of the optical path. This can reduce losses of the distributed light signal. Thus, in such an embodiment, the plurality of light emitters are also positioned in a fractal layout thereby matching the fractal layout. According to an example embodiment the optical distribution network is designed such that the phase difference between adjacent light emitters is an integer multiple of $2\pi$. This allows to obtain a controlled quasi-planar phase front directed vertically away from and substantially parallel to the light source.

Figure 2:
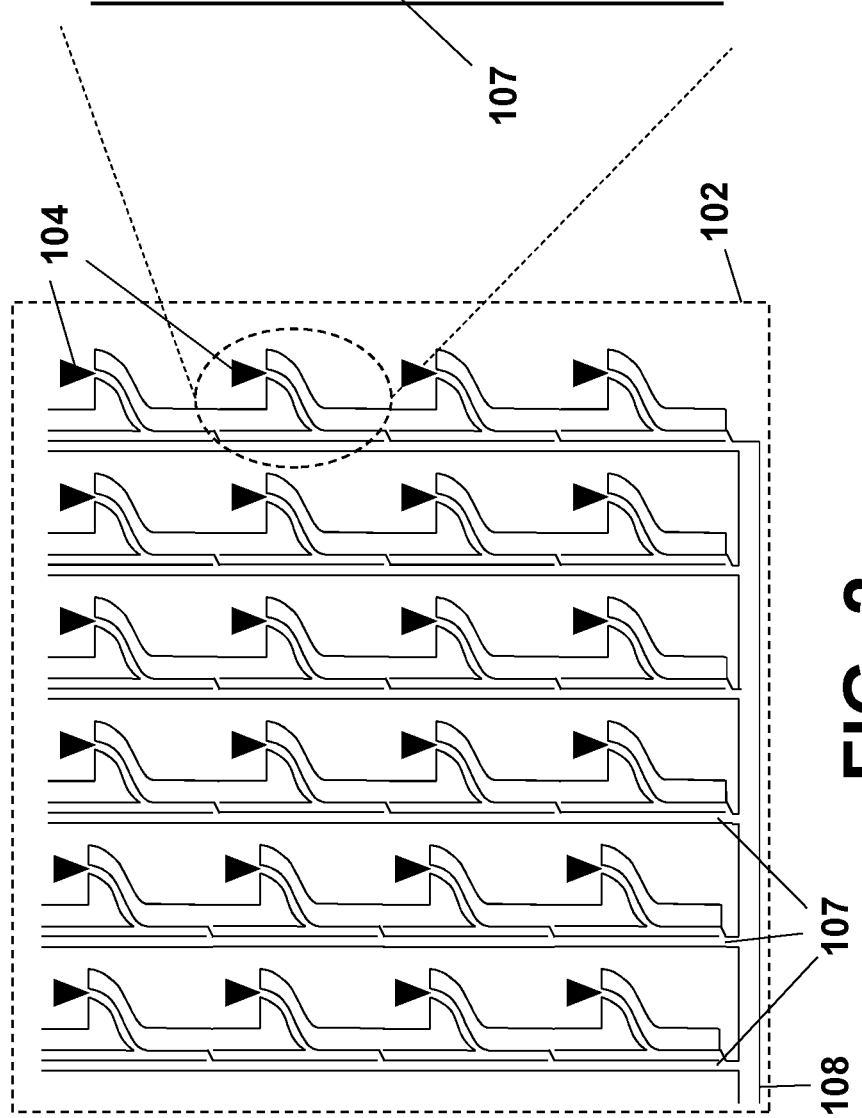
FIG. 2 illustrates a light source for a lens-free device, according to example embodiments.

FIG. 2 illustrates a light source 102 comprising a plurality of optical waveguides 107. All optical waveguides 107 are optically coupled to a main optical waveguide 108 which supplies a light signal. An external light signal may be coupled into the main optical waveguide 108 using an optical fiber. Light emitters 104 are optically coupled along each optical waveguide 107.

An example embodiment of the optical coupling is illustrated in FIG. 3. Each light emitter 104 is optically coupled to an optical waveguide 107 with a sub-optical waveguide 109. The dashed arrows indicate the distribution of a light signal. The sub-optical waveguide 109 is at one end optically connected to the optical waveguide 107 and at the other end optically connected to the light emitter 104 such that a light signal propagating through the optical waveguide 107 distributes in the sub-optical waveguide 109 where it further propagates and reaches the light emitter 104 where it is coupled out. The ensemble of all light emitters 104 creates a quasi-planar wavefront.

The light source as presented above can be integrated in a semiconductor lens-free imaging device. This reduces cost of the lens-free imaging device and increases compactness.

According to an example embodiment, the lens-free imaging device may comprise a component that may be a fluidic or a micro-fluidic channel. In such an embodiment, the light source is positioned such that objects propagated by the fluidic channel can be illuminated by the wavefront generated by the light source. For example, the light source may be located in a layer underneath the fluidic channel. In a semiconductor lens-free device, the fluidic channel may be patterned on top of the light source using standard semiconductor processing techniques. According to an example embodiment, the fluidic component comprises a plurality of micro-fluidic channels located on top of the light source, wherein the plurality of light emitters are positioned such that each micro-fluidic channel is illuminated by at least two different light emitters.

The use of a light source as presented above can allow complete integration into a semiconductor lab-on-a-chip device.

Figure 4A:
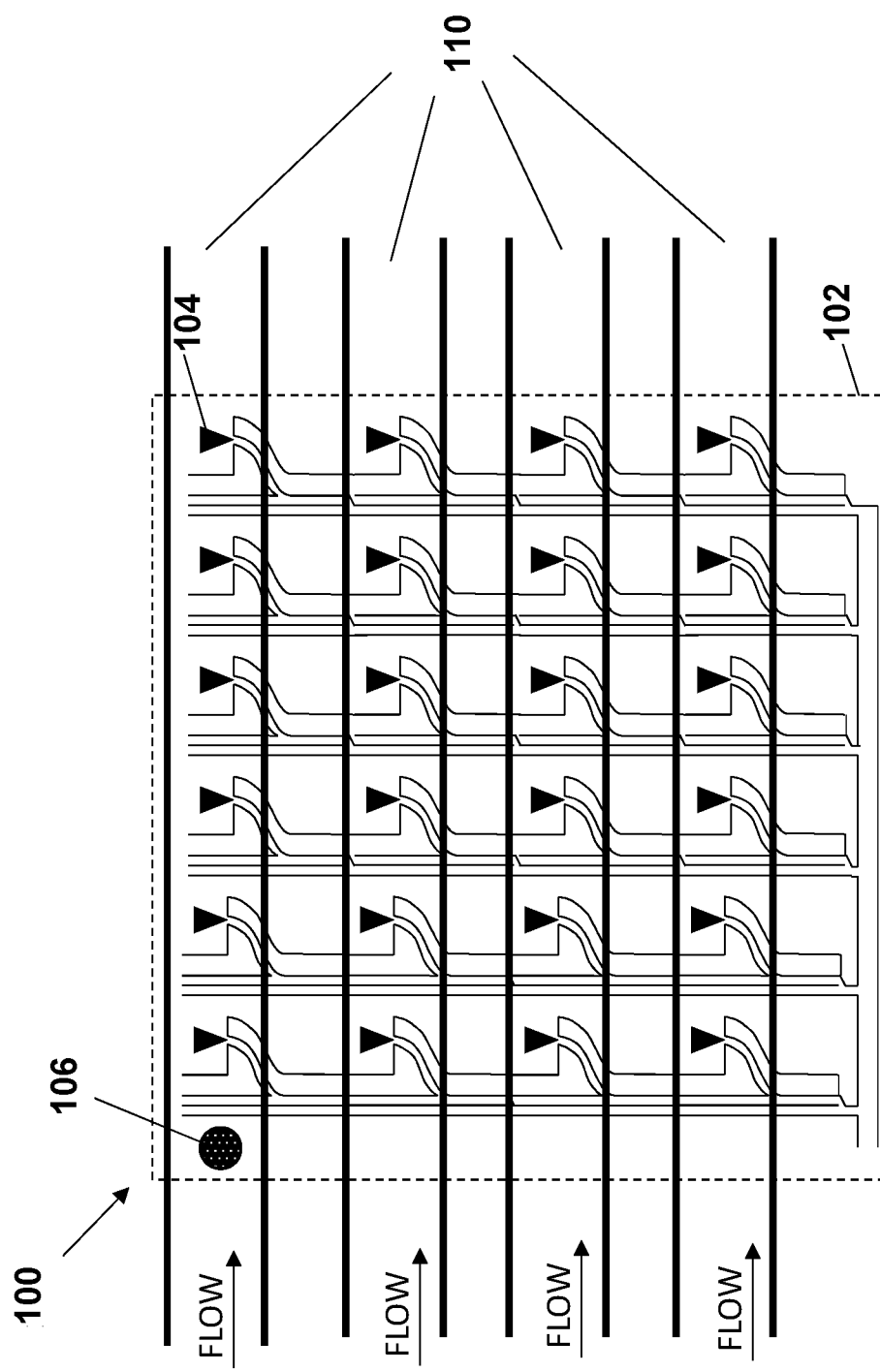
FIG. 4A illustrates a lens-free device, according to example embodiments.

FIG. 4A illustrates a lens-free device 100 with a plurality of micro-fluidic channels (between adjacent solid black lines) 110 located on top of the light source 102. Each microfluidic channel 110 is positioned on top of a row of light emitters 104. An object 106 propagating through a micro-fluidic channel 110 is illuminated by multiple light emitters 104 positioned underneath the micro-fluidic channel 110. For example, the object may be imaged multiple times using different light emitters, e.g. from different angles, at a certain location in the micro-fluidic channel. This type of illumination can be used in applications such as multi-view imaging application, e.g. tomographic imaging. In such an embodiment, light emitters are configured such that objects in the micro-fluidic channel are illuminated from different angles at a certain location in the micro-fluidic channel. Alternatively, the object is illuminated multiple times by single light emitters as the object propagates through the micro-fluidic channel. It is not essential that the object is illuminated multiple times at the same time.

Figure 4B:
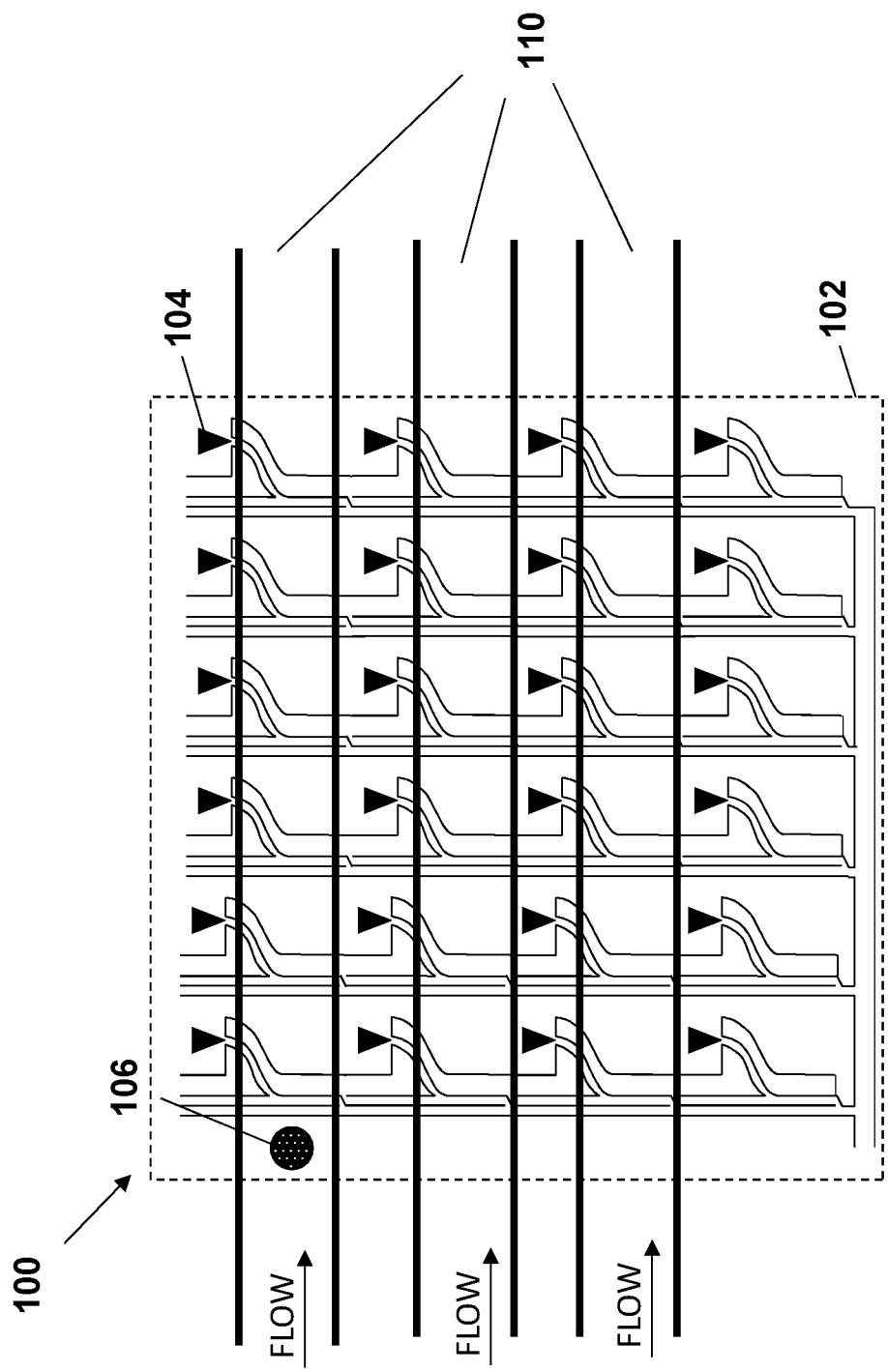
FIG. 4B illustrates a lens-free device, according to example embodiments.

FIG. 4B illustrates a lens-free device 100 with a plurality of micro-fluidic channels (between adjacent solid black lines) 110 located on top of the light source 102. The position of each micro-fluidic channel 110 is aligned with a row of light emitters 104. For example the channel may be in-between two rows of light emitters. An object 106 propagating through a micro-fluidic channel 110 is illuminated by multiple light emitters 104 positioned in a layer underneath the micro-fluidic channel 110. For example, the object may be imaged multiple times using different light emitters, e.g. from different angles, at a certain location in the micro-fluidic channel. This type of illumination can be used in applications such as multi-view imaging application, e.g. tomographic imaging. In such an embodiment, light emitters are configured such that objects in the micro-fluidic channel are illuminated from different angles at a certain location in the micro-fluidic channel. Alternatively, the object is illuminated multiple times by single light emitters as the object propagates through the micro-fluidic channel. It is not essential that the object is illuminated multiple times at the same time.

According to an example embodiment, the component is or comprises a sample holder. The sample holder may include a fluidic compartment and is transparent at least to visible light. For example, the sample holder may be fabricated from glass or a transparent plastic. The sample holder may comprises a fluidic compartment that can hold a fluid sample. The fluidic compartment may be fluidically connected to another fluidic channel of the lens-free device such that a fluid sample comprising objects can be provided in the sample holder. According to an example embodiment of the disclosure, the detector, e.g. an image sensor, is coupled to a surface of the sample holder and the light source is coupled to another surface of the sample holder. In a semiconductor device, the sample holder is attached to a layer of the lens-free device comprising the light source, e.g. an oxide layer. The light source and the detector may be positioned substantially parallel or opposite to each other wherein the sample holder is positioned in between the light source and the detector.

FIG. 5 illustrates an example embodiment of the disclosure. The device comprises a substrate 111, e.g. a silicon or glass substrate. The substrate 111 comprises a fluidic channel 112 for providing a fluid sample. Atop the substrate 111, a light source 102 having a plurality of light emitters 104, as described in any of the embodiments in this disclosure, is located in a semiconductor layer 113, e.g. an oxide layer. Atop the light source 102, a sample holder 101 is present. For example, the sample holder is attached, clamped or bonded to surface 115 of the semiconductor layer 113. The sample holder comprises a fluidic compartment 116 that is in fluidic connection with the fluidic channel 112. Atop the sample holder, a detector 103 is present. For example, the detector is attached, bonded or clamped to a surface 114 of the sample holder. The sensing side of the detector 103, comprising photodiodes, faces the surface 114. A fluid sample is provided by the fluidic channel 112 in the fluidic compartment 116 of the sample holder 101. When the fluid sample is present in the fluidic compartment 116, the light source 102 illuminates the complete fluid sample with a controlled wavefront, e.g. a quasi-planar wavefront, generated by the ensemble of out-coupled light signal of the light emitters 104. The detector 103 is positioned such that interference patterns of illuminated objects are detected directly or indirectly by the sensing side of the detector.

According to an example embodiment of the disclosure, the light emitters are out-coupling structures designed to out-couple a light signal which is fed to them, out of the plane of the out-coupling structures. Reference is made to patent application EP14200424 which describes embodiments of such out-coupling structures. Reference is also made to patent application EP14200424 describing modifications to the out-coupling structures for reducing decay of a light signal in out-coupling structures.

According to an example embodiment of the disclosure, the light emitters are grating couplers. The grating couplers may be configured such that a light signal distributed to each grating coupler is coupled out of the plane of the grating coupler. The size, shape and the position of the grating couplers relative to each other are designed such that the ensemble of out-coupled light signals creates a controlled wavefront suitable for large area lens-free imaging, e.g. a quasi-planar wavefront. For example, the grating couplers may be designed such that each grating coupler emits a collimated beam. The positions of the grating couplers are selected such that the ensemble of emitted collimated beams gives rise to the controlled wavefront through destructive/constructive interference of different collimated beams. To eliminate higher diffraction orders of light emitted by the light emitters, the positions of the grating couplers may be selected such that these higher order diffraction orders are eliminated through destructive interference of the emitted light. In a specific embodiments, the grating couplers are focusing grating couplers.

According to an example embodiment of the disclosure, the light emitters are microstructures or micro-holes, etched into a slab. Such an embodiment may be referred to as slab-based illumination. In such an embodiment, each micro-structure functions as a light emitter. For example, the micro-structures are partly or fully fabricated in a slab of material that is suitable for propagating light, e.g. a slab of semiconductor material such as silicon or silicon nitride. For example, the micro-structures are through-holes which extend completely through the slab. The micro-structures are configured such that a light signal propagating through the slab and reaching each micro-structure is coupled out of the plane of the slab. The size, shape and the position of the micro-holes relative to each other are designed such that the ensemble of out-coupled light signals creates a controlled wavefront, e.g. a quasi-planar wavefront, suitable for performing lens-free imaging and in particular large area lens-free imaging. When using slab-based illumination, the phase information in a large area can be better maintained. As an advantage, better control over the generated wavefront can be achieved. A light signal may be provided to the slab by using an optical waveguide that is optically coupled to the slab.

Figure 6:
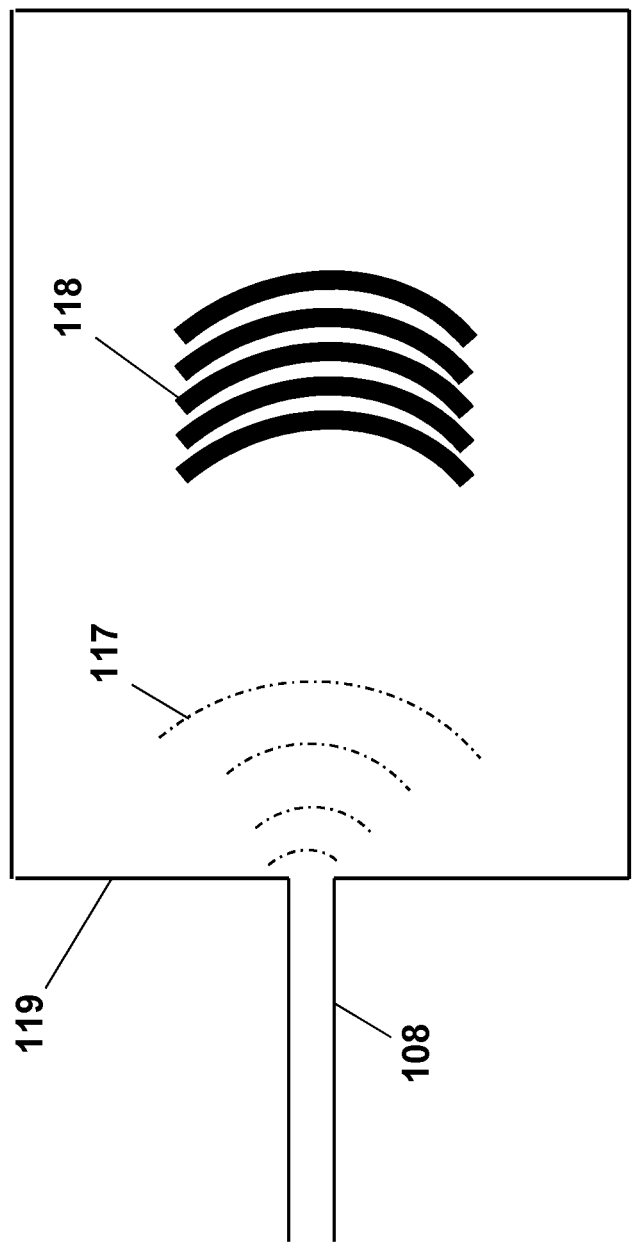
FIG. 6 illustrates a light source, according to example embodiments.

FIG. 6 illustrates an example embodiment of slab based illumination. A light signal is fed to the optical waveguide 108. The optical waveguide 108 is optically coupled to the slab 119. A light signal propagating through the optical waveguide 108 and reaching the slab 119 gives rise to the creation of a light wavefront 117. The micro-structures 118 in fabricated in the slab 119 gives rise to the creation of a controlled wavefront that is suitable for lens-free imaging.

According to an example embodiment, the lens-free device is a silicon integrated device. The lens-free device may be used for cell culture monitoring or for drug toxicity testing. Due to its compactness and easiness to integrate in a semiconductor device, the photonic phased array is very suitable for use in a cell sorting device, e.g. a semiconductor cell sorting device or a lens-free cell sorting device where lens-free imaging is used to sort cells.

According to another example embodiment of the disclosure, the lens-free imaging device 100 may be manufactured using standard semiconductor processing steps, e.g. CMOS compatible process steps, by providing a substrate, creating a photonics layer comprising the light source 102 on the substrate. Optionally, according to an example embodiment, on top of the photonics layer, a fluidic component 101 may be created. On top of the fluidic component 101 a detector 103 for detecting light is attached. Optionally, the substrate may be a fluidic substrate which is in fluidic connection with the fluidic component 101, e.g. through the photonics layer. According to a specific embodiment the lens-free imaging device 100 may be manufactured by: 1) providing a silicon substrate, 2) patterning a photonics layer comprising the light source 102 on top of the silicon substrate, 3) patterning a fluidic component 101 on top of the photonics layer and 4) bonding a detector 103 to the fluidic component.

The invention claimed is:

1. A lens-free device for imaging one or more objects, the lens-free device comprising:
   a light source positioned for illuminating at least one object using a light signal; and
   a detector positioned for recording interference patterns of the illuminated at least one object,
   wherein the light source comprises a plurality of light emitters that are positioned and configured to create a controlled light wavefront for performing lens-free imaging,
   wherein the plurality of light emitters comprises a photonic phased array, and
   wherein a coherence length of the light signal is at least 10 times larger than a diagonal dimension of the photonic phased array.

2. The lens-free device according to claim 1,
   wherein the light source further comprises an optical distribution network configured for distributing the light signal to the plurality of light emitters, and
   wherein a phase difference between adjacent light emitters is an integer multiple of $2\pi$.

3. The lens-free device according to claim 1, wherein the controlled light wavefront comprises a quasi-planar wavefront for performing large-area, lens-free imaging.

4. The lens-free device according to claim 1, wherein the light emitters comprise grating couplers.

5. The lens-free device according to claim 1, wherein the light emitters comprise micro-structures fabricated in a slab of material suitable for propagating light.

6. The lens-free device according to claim 1,
   wherein the light source further comprises an optical distribution network configured for distributing the light signal to the plurality of light emitters,
   wherein the optical distribution network is a single-mode photonic waveguide distribution network, and
   wherein the optical distribution network comprises a matrix or fractal layout.

7. The lens-free device according to claim 1,
   wherein the light source further comprises an optical distribution network configured for distributing the light signal to the plurality of light emitters, and
   wherein the optical distribution network is designed such that a distance between the light source and the detector is between 500 µm and 5 mm.

8. The lens-free device according to claim 1, wherein the lens-free device is a silicon integrated device.

9. The lens-free device according to claim 1, further comprising a component for providing the illuminated at least one object.

10. The lens-free device according to claim 9, wherein the component comprises a sample holder, a fluidic channel, or a plurality of microfluidic channels.

11. An in-flow cell imaging system comprising at least one lens-free device, wherein each lens-free device comprises:
    a light source positioned for illuminating at least one object using a light signal; and
    a detector positioned for recording interference patterns of the illuminated at least one object,
    wherein the light source comprises a plurality of light emitters that are positioned and configured to create a controlled light wavefront for performing lens-free imaging,
    wherein the plurality of light emitters comprises a photonic phased array, and
    wherein a coherence length of the light signal is at least 10 times larger than a diagonal dimension of the photonic phased array.

12. The in-flow cell imaging system according to claim 11,
    wherein the light source further comprises an optical distribution network configured for distributing the light signal to the plurality of light emitters, and
    wherein a phase difference between adjacent light emitters is an integer multiple of $2\pi$.

13. The in-flow cell imaging system according to claim 11, wherein the controlled light wavefront comprises a quasi-planar wavefront for performing large-area, lens-free imaging.

14. The in-flow cell imaging system according to claim 11, wherein the light emitters comprise grating couplers.

15. The in-flow cell imaging system according to claim 11, wherein the light emitters comprise micro-structures fabricated in a slab of material suitable for propagating light.

16. The in-flow cell imaging system according to claim 11,
    wherein the light source further comprises an optical distribution network configured for distributing the light signal to the plurality of light emitters,
    wherein the optical distribution network is a single-mode photonic waveguide distribution network, and
    wherein the optical distribution network comprises a matrix or fractal layout.

17. The in-flow cell imaging system according to claim 11,
wherein the light source further comprises an optical distribution network configured for distributing the light signal to the plurality of light emitters, and
wherein the optical distribution network is designed such that a distance between the light source and the detector is between 500 μm and 5 mm.

18. The in-flow cell imaging system according to claim 11, wherein each lens-free device is a silicon integrated device.

19. The in-flow cell imaging system according to claim 11, further comprising a component for providing the illuminated at least one object.

* * * * *